United States Patent [19]

Habiger

[11] 4,301,835
[45] Nov. 24, 1981

[54] SPEED CONTROL AND TRANSMISSION VENT VALVE

[75] Inventor: Cyril W. Habiger, Joliet, Ill.

[73] Assignee: Caterpillar Tractor Co., Peoria, Ill.

[21] Appl. No.: 107,475

[22] Filed: Dec. 26, 1979

[51] Int. Cl.³ ............................................. F15B 13/02
[52] U.S. Cl. .................................... 137/596; 91/447; 137/613
[58] Field of Search ................... 91/447; 137/596, 613

[56] References Cited

U.S. PATENT DOCUMENTS

| | | |
|---|---|---|
| 1,339,720 | 5/1920 | Shaver ............................. 251/30 X |
| 3,247,669 | 4/1966 | Hann . |
| 3,807,174 | 4/1974 | Wagenseil et al. . |
| 3,952,514 | 4/1976 | Habiger . |
| 3,952,515 | 4/1976 | Habiger et al. . |
| 3,996,743 | 12/1976 | Habiger et al. . |

Primary Examiner—Gerald A. Michalsky

Attorney, Agent, or Firm—Phillips, Moore, Weissenberger, Lempio & Majestic

[57] ABSTRACT

A speed control and transmission vent valve (10) includes a first valve (12), a second valve (14) having first (64) and second inlets (66), an openable outlet (70) and a spool (62 or 62') movable in response to fluid in the inlets (64,66) between first, second and third positions, a passage (112) connecting the first valve (12) to the first inlet (64), and two-state switch means (16) for communicating fluid in the passage (112) to the second inlet (66) in response to one state of the switch means (16) to move the spool (62 or 62') from the first to the second position and for communicating fluid in the passage (112) to the first inlet (64) in response to a second state of the switch means (16) to move the spool (62 or 62') from the second position to the third position in which a fluid control signal is generated. The speed control and transmission vent valve (10) can be used in a tractor having a hydrostatic transmission, and is directed to reducing the operator skill and control needed to actuate the transmission to move the vehicle.

19 Claims, 8 Drawing Figures

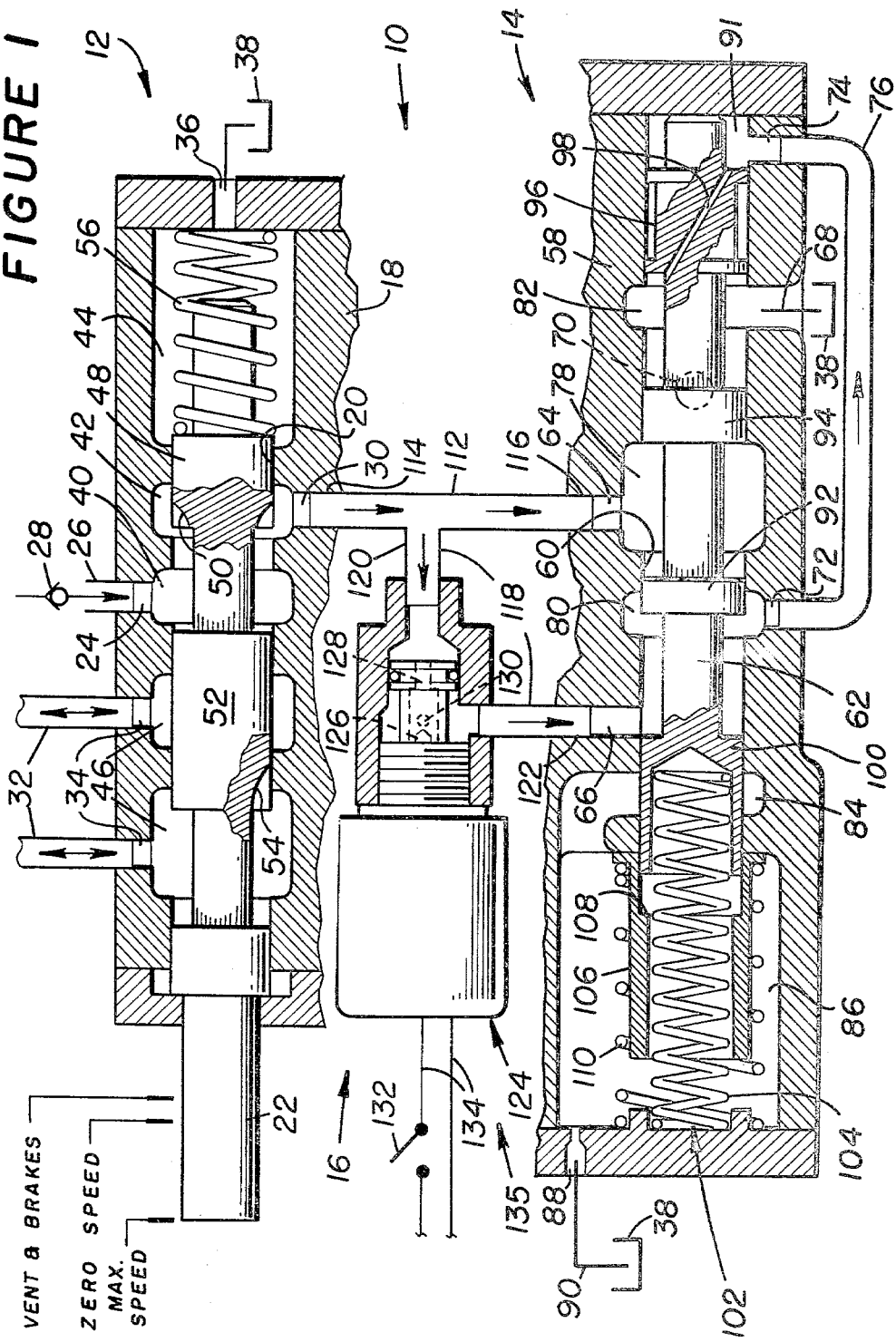

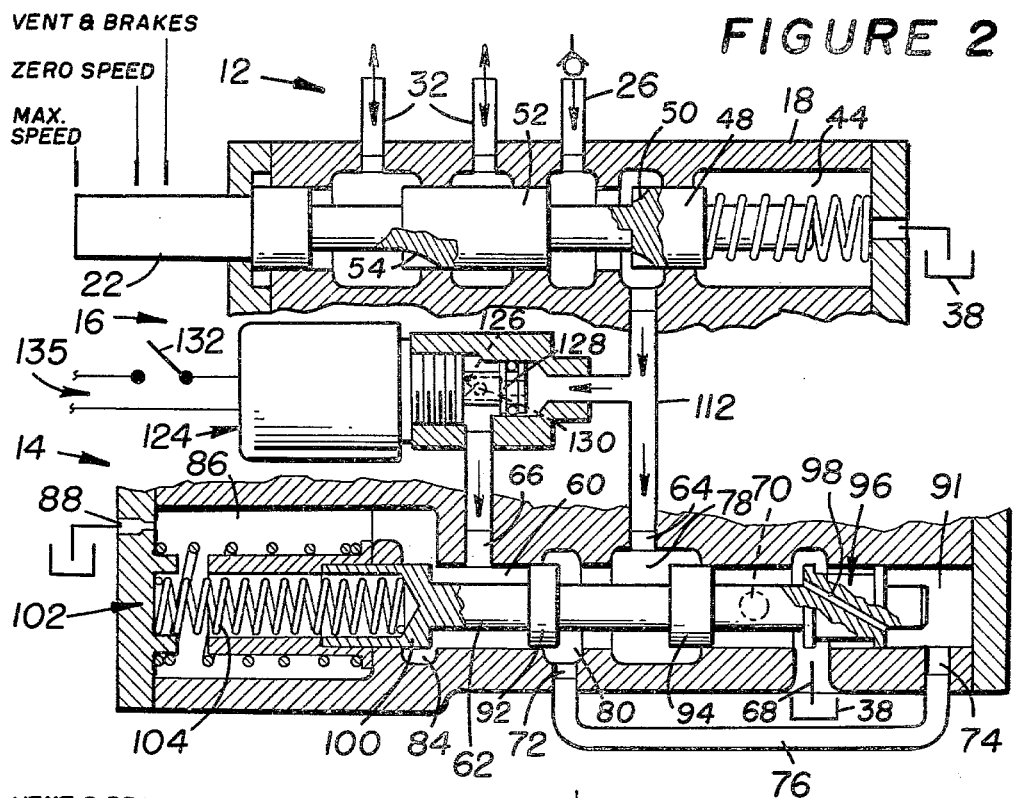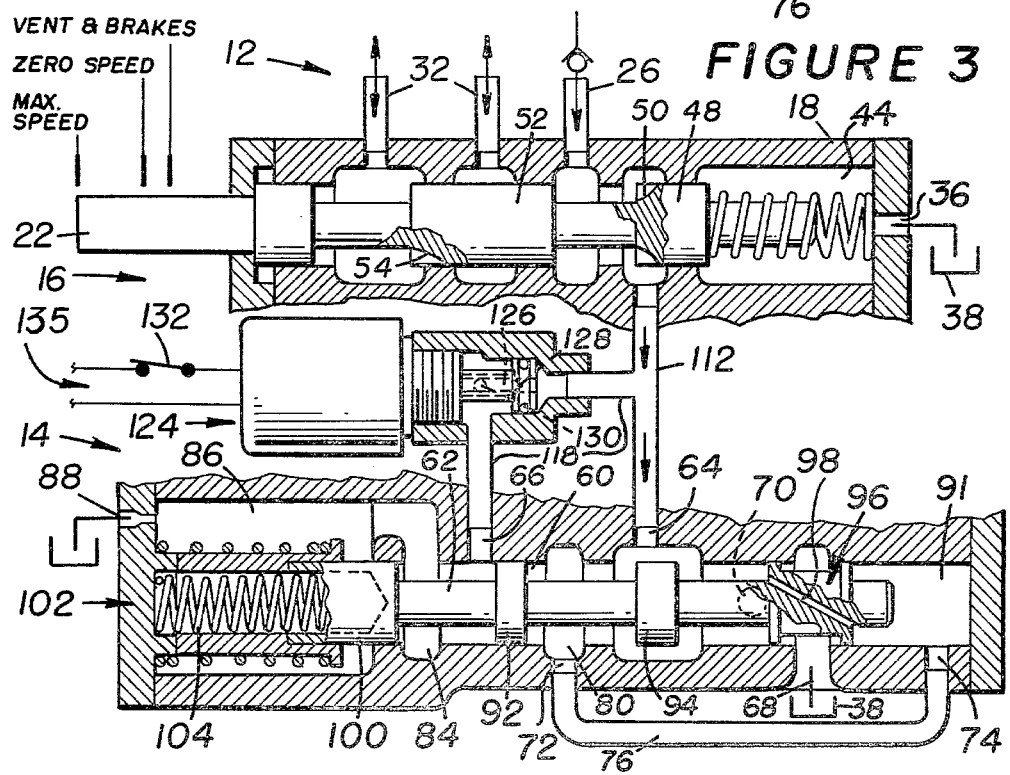

SPEED CONTROL AND TRANSMISSION VENT VALVE

DESCRIPTION

1. Technical Field

This invention relates to control valves for generating control signals and, more particularly, to an improved speed control and transmission vent valve for generating fluid pressure control signals.

2. Background Art

Hydrostatic transmissions are used to move vehicles including earthworking vehicles such as tractors. The transmissions typically can have two variable displacement pumps, which are driven by the prime mover or vehicle engine, and two motors which are driven, respectively, by the pumps. Each pump is in communication with a motor through a closed hydrostatic loop having a pair of conduits coupled between the pump and corresponding motor. Thus, when the vehicle is moving, each pump will be pumping hydraulic fluid through one of the conduits to the motor, with this fluid then being returned through the other conduit to the pump. A control system for the hydrostatic transmission will be described briefly below, but for a more detailed discussion reference should be made to, for example, U.S. Pat. No. 3,952,514, issued Apr. 27, 1976, by Cyril W. Habiger.

Control of the hydrostatic transmission is accomplished in part with a valve assembly that responds to a pressure control signal. When this pressure control signal is not generated, the valve assembly interconnects the conduits of a pair in the closed loop to prevent operation of the corresponding motor. This function is commonly referred to as "transmission venting". When the pressure control signal is generated, the valve assembly does not interconnect these conduits so that the motor can be driven by the corresponding pump.

The same pressure control signal also is used to actuate a spring applied, fluid pressure released parking brake. When the control signal is not generated, the brake is engaged, whereas when the control signal is generated the brake is disengaged to permit movement of the vehicle.

The control of the hydrostatic transmission also is accomplished in part with an actuator unit which regulates the displacement of the pumps, thereby setting the rate of operation of the motors. The actuator unit itself is responsive to a pressure differential signal existing between a pair of input conduits. As the pressure differential signal changes, the displacement of the pumps and, hence, the vehicle speed will change.

A valve known as a speed control and transmission vent valve is included in the control system for the hydrostatic transmission. This valve functions to generate the pressure control signal for controlling the transmission venting and the actuation of the parking brake, as well as to control the differential pressure signal between the pair of input conduits to the actuator unit. Various embodiments of this valve are available.

One embodiment of the speed control and transmission vent valve includes in one body a manual spool valve and an automatic spool valve which can communicate by a pair of passages. The manual spool valve is movable continuously from a vent and brake position to a zero speed position and then to a maximum speed position. The automatic spool valve is movable from an initial position in which the pressure control signal can not be generated to a second or final position in which the pressure control signal can be generated.

In the vent and brake position, a pressurized fluid supply flowing into the manual spool valve is communicated with a drain so that the control signal is not generated. As the manual spool valve is moved to the zero speed position, this pressurized fluid supply is blocked from drain and directed through one of the passages communicating the two valves to shift the automatic spool valve from the initial position to the final position. In the zero speed position, the other passage interconnecting the two valves is opened to provide a path for the supply from the manual spool valve through the automatic spool valve to an output conduit carrying the pressure control signal. Thus, in this condition the transmission is not vented and the parking brake is released; however, the vehicle will not yet move. This is because the manual spool valve also communicates the pair of input lines to the actuator unit with one another such that there is zero differential pressure and no pump displacement. Then, the manual spool valve can be moved from the zero speed position through to the maximum speed position to control the communication between the pair of input lines, and, thus, the differential pressure signal between these lines so that the pump of the vehicle speed controlled.

With the manual spool valve in, for example, the maximum speed position and the automatic spool in its second position, it is possible for the transmission to become vented and the parking brake engaged. If there is a drop in the pressurized supply due to, for example, a temporary pressure line loss or the engine being shut down, the automatic spool valve will automatically return to its initial position in which the control signal will not be generated. Then, the temporary line loss stops or the engine is started up again, the manual spool valve must be reset to its vent and brake position before the control signal can again be generated. The manual spool valve can then be moved from this position through the zero speed position to the maximum speed position as already described.

One problem with the prior speed control and transmission vent valve is that it requires a high degree of skill in operating the manual spool valve. If the manual spool valve is moved too quickly from the brake and vent position to the zero speed position, the automatic spool valve may not be shifted from its initial position to its final position in which the pressure control signal can be generated. This is because insufficient supply pressure may be directed through the one passage of the speed control and vent valve to so move the automatic spool valve. Consequently, the automatic spool valve will remain in its initial position, preventing the control signal from being generated.

Another problem with the prior speed control and transmission valve is that it requires some travel between the vent and brake position and the zero speed position before the automatic spool valve can be shifted from the initial position to the final position. This undesirably constitutes a "dead-band" in the valve.

Yet another problem is that the vehicle operator must continuously control the manual spool valve when shifting it through its various positions. For example, if the above-mentioned line loss or engine shut down occurs, the manual spool valve must be returned to the vent and brake position, and then shifted through to the various positions. This disadvantageously occupies, for example, the operator's hand, which might be used for other purposes in controlling the tractor.

Moreover, if the manual spool valve is in the maximum speed position and the automatic spool valve is in the final position so that the control signal is being generated, the operator may want to quickly vent the transmission. This requires shifting the manual spool valve back to the vent and brake position to first communicate the pressurized supply with the drain. Such shifting requires the operator to control the manual spool valve for a relatively long period of time.

DISCLOSURE OF THE INVENTION

The present invention is directed to overcoming one or more of the problems as set forth above.

A valve is provided having first valve means for supplying pressurized fluid and second valve means for generating a fluid control signal, with the second valve being movable in response to the pressurized fluid between one position in which the control signal is not generated and another position in which the control signal is generated, the improvement comprising switch means for controlling communication of the pressurized fluid between the first valve means and the second valve means to move the second valve means from the one position to the other position.

Prior valves require operator skill and relatively long periods of time in generating or not generating a pressure control signal to either actuate or vent the hydrostatic transmission. They also have a "dead-band" through which the valve must travel before the control signal can be generated. With the present invention, the operator need only quickly move a switch means between an on and off state to control generation of the pressure control signal.

BRIEF DESCRIPTION OF THE DRAWINGS

FIG. 1 is an enlarged sectional view of an embodiment of the valve of the present invention and showing the valve in one position.

FIG. 2 is a view similar to FIG. 1, but showing the valve in another position.

FIG. 3 is a view similar to FIG. 1, but showing the valve in yet another position.

BEST MODE OF CARRYING OUT THE INVENTION

Figure 4:
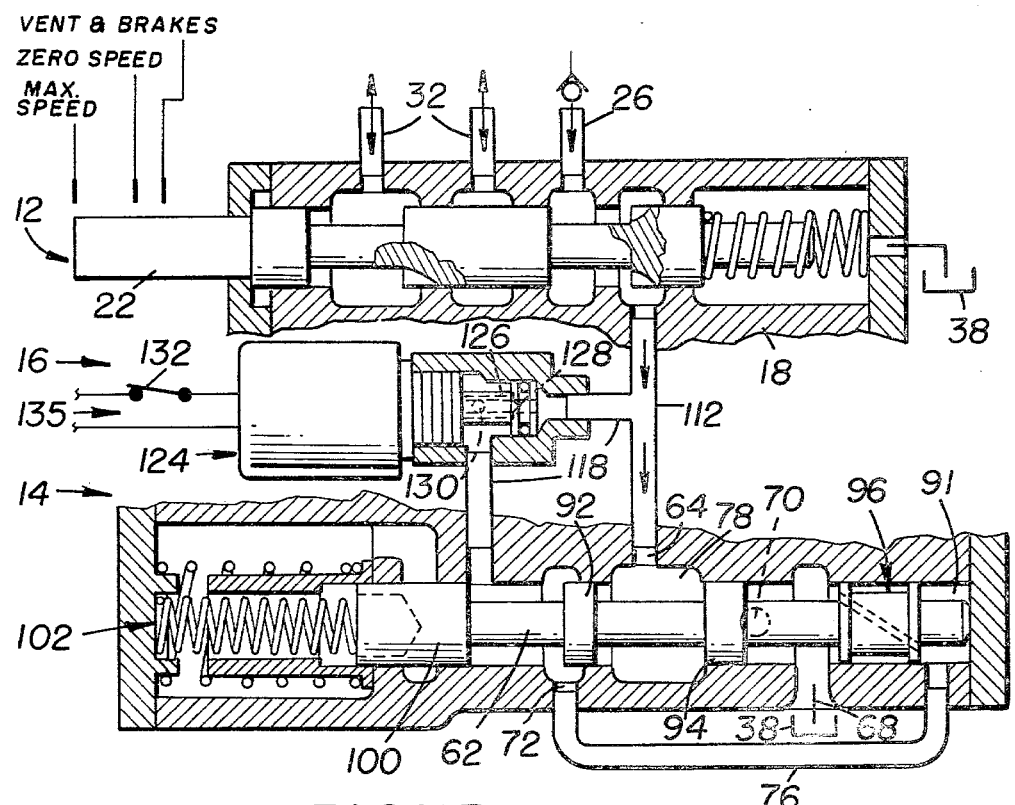
FIG. 4 is a view similar to FIG. 1, but showing still another position of the valve.

FIG. 1 shows a valve 10 which is, for example, a speed control and transmission vent valve that is used as part of a control system (not shown) for controlling a hydrostatic transmission and spring applied brakes, as will be further described. Valve 10 includes a first valve means 12 for supplying pressurized fluid, a second valve means 14 which is movable in response to the supplied pressurized fluid to generate a pressure control signal, and a switch means 16 for controlling communication of the pressurized fluid between the first valve means 12 and the second valve means 14 to control the movement or positioning of the latter.

The first valve means 12 has a body 18, a bore 20 and a spool 22 which is manually movable within the bore 20. The body 18 has a fluid inlet 24 receiving pressurized fluid from a conduit 26 having a check valve 28. Body 18 also has a fluid outlet 30 for receiving the pressurized fluid in the inlet 24. A pair of differential pressure lines 32 is coupled to a pair of openings or ports 34 in the body 18. A fluid outlet 36 is coupled between the body 18 and a drain or tank 38.

The bore 20 has an annular groove 40 communicating with the inlet 24, and an annular groove 42 communicating with the groove 40 and the outlet 30. A fluid chamber 44 can communicate with the groove 42 and is in communication with the outlet 36. A pair of annular grooves 46 communicate with the pair of openings 34, respectively.

The spool 22 has a land 48 with a metering slot 50 which controls communication between the groove 42 and the chamber 44. Another land 52 of the spool 22 has a metering slot 54 to control communication between the pair of differential pressure lines 32 via the grooves 46 and openings 34. A spring 56 is disposed between the body 18 and the land 48 to bias the spool 22 into its leftward most position shown. In this position, the groove 40 is open to the groove 42 so that the fluid in line 26 can be directed to the outlet 30, while the chamber 44 is closed to the groove 42 with land 48. Also, the land 52 blocks communication between the pair of openings 34 so that a maximum differential pressure exists between the pair of lines 32. As indicated in FIG. 1, this leftward position is termed "maximum speed", but the spool 22 can be moved rightward against the bias of spring 56 to a "zero speed" position and a "vent and brakes" position, as will be further described.

The second valve means 14 includes a body 58, which can be the same as body 18, a bore 60 and a spool 62 which is automatically movable. Body 58 includes a fluid inlet 64, a fluid inlet 66, a fluid outlet 68 leading to the tank 38 and a fluid outlet 70 in which a pressure control signal is generated. The body 58 also includes an outlet 72 and an inlet 74 which are in communication through a conduit 76.

The bore 60 has an annular groove 78 in communication with the inlet 64 and an annular groove 80 which can communicate with the inlet 64 or inlet 66. Another annular groove 82 can communicate the outlet 70 with the tank 38 via the line 68, as shown. Another annular groove 84 can communicate the inlet 66 with a fluid chamber 86 which leads to the tank 38 via a restricted orifice 88 and a conduit 90. At the right side of the bore 60, a fluid chamber 91 receives pressurized fluid in the conduit 76 and inlet 74 to move the spool 62 to the left.

The spool 62 has a land 92 which cooperates with the annular groove 80 to communicate the inlet 66 or the inlet 64 with the outlet 72. A land 94 controls communication of the inlet 64 with the outlet 70. A land shown generally at 96, having an internal bleed passage 98 therethrough, controls communication of the outlet 70 with the line 68 and tank 38. Another land 100 controls communication of the inlet 66 with the annular groove 84 and fluid chamber 86.

A means 102 for controlling or opposing the movement of the spool 62 includes a relatively light biasing spring 104, disposed between the land 100 and the body 58, which is compressed upon movement of the spool 62 to the left. An elongated collar 106 is partially coupled around the land 100 and has a shoulder 108 into which the land 100 can slide. A relatively heavy biasing spring 110 is disposed between the collar 106 and the body 58 to be compressed when the spool 62 and hence land 100 moves further to the left against the shoulder 108.

A fluid passage 112 has one end 114 coupled to the outlet 30 in the body 18 and another end 116 coupled to the inlet 64 of the body 58. Thus, valve means 12 can supply pressurized fluid from the outlet 30 through the passage 112 to the inlet 64 of the valve means 14.

The switch means 16 includes an openable and closeable fluid passage 118 having one end 120 coupled to the passage 112 and another end 122 coupled to the inlet 66. A solenoid valve 124, which is normally open or de-energized, has an armature 126 that can be removably seated on a seat 128. When the solenoid valve 124 is open, the armature 126 is off the seat 128 so that passage 118 is open to communicate the end 120 through the seat 128 and an opening 130 in the solenoid 124 to the end 122. When the valve 124 is closed or energized, the armature 126 is seated on the seat 128 to close passage 118, i.e., to prevent communication between end 120 and end 122. An on-off or two state switch 132 is electrically coupled via lines 134 to the solenoid valve 124 to energize and de-energize the valve 124. Thus, the solenoid valve 124 and switch 132 constitute a means 135 for opening and closing the passage 118.

Figure 5:
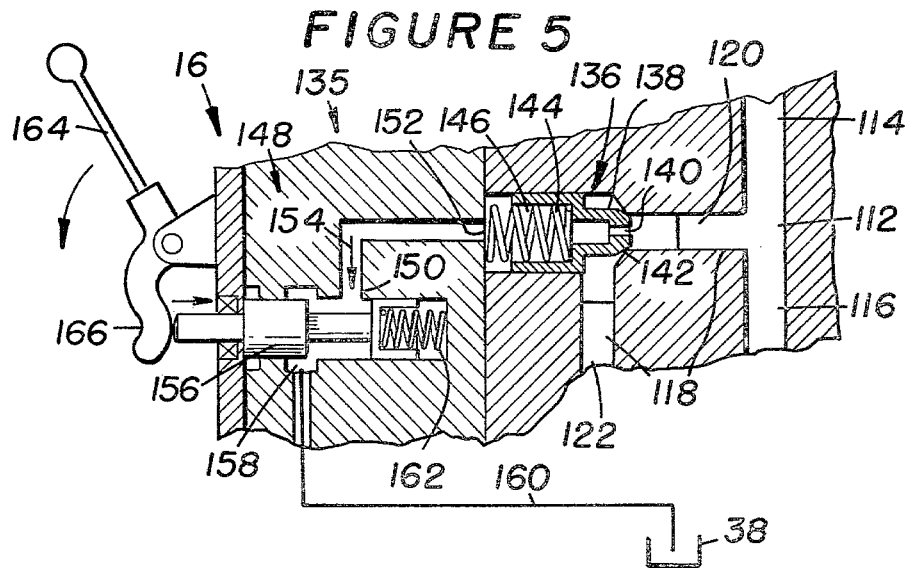
FIG. 5 is an enlarged sectional view of another embodiment of the valve of FIG. 1.

FIG. 5 illustrates another embodiment of the switch means 16 for controlling communication of the pressurized fluid supply between the valve means 12 and the valve means 14. Only the alternative embodiment of the switch means 16 is shown in FIG. 5 because the valve means 12 and the valve means 14 are the same as in FIG. 1. Thus, FIG. 5 shows the passage 112 having the end 114 leading to the valve means 12 and the end 116 leading to the valve means 14.

The switch means 16 of FIG. 5 includes the openable and closeable passage 118 having the one end 120 coupled to the passage 112 and the other end 122 leading to the second valve means 14. A poppet valve 136 includes a head 138, having an orifice 140, which is biased onto a seat 142 by a spring 144. The orifice 140 communicates the end 120 of the passage 118 with a fluid chamber 146 formed behind the head 138. When the head 138 is off the seat 142, the end 120 communicates with the end 122 of the passage 118, i.e., the passage 118 is open. When the head 138 is seated on the seat 142, the passage 118 is closed so that the end 120 does not communicate with the end 122.

A pilot valve 148 of the switch means 16 has an inlet 150 communicating with the fluid chamber 146 through an opening 152 and a fluid line 154. A spool 156 controls communication between the inlet 150 and an outlet 158 leading to the tank 38 via a line 160. Spool 156 is biased into the position shown by a spring 162 so that the line 154 is normally open to the line 160. A manual lever 164 is movable between the one position shown and another position in which a cam 166 is moved against the spool 156. In this latter position, the spool 156 will be moved by the cam 166 against the bias of the spring 162 to close the communication between the inlet 150 and outlet 158.

When the lever 164 is in the position shown, the line 154 communicates through the pilot valve 148 with the line 160. Consequently, a pressure differential will develop between one side of orifice 140 of the head 138 and the other side of the orifice 140 of the head 138 as fluid in the end 120 flows through the orifice 140. This pressure differential will be sufficient to force the head 138 off of the seat 142 against the bias of the spring 146 and, thereby, open communication between the end 120 and the end 122 of the passage 118. When the lever 164 is moved to the other position so that the spool 156 closes communication between the inlet 150 and the outlet 158, fluid pressure will build up in the chamber 146 to keep the head 138 on the seat 142, whereby the passage 118 will be closed. Thus, the lever 164 is similar to the switch 132 in that it is a two-state device, in which in the one state or position shown, the poppet valve 136 is normally open to open passage 118 and in the other state or position the poppet valve 136 is closed to close passage 118. Therefore, poppet valve 136, pilot valve 148 and lever 164 constitute the means 135 for opening the closing passage 118.

Figure 6:
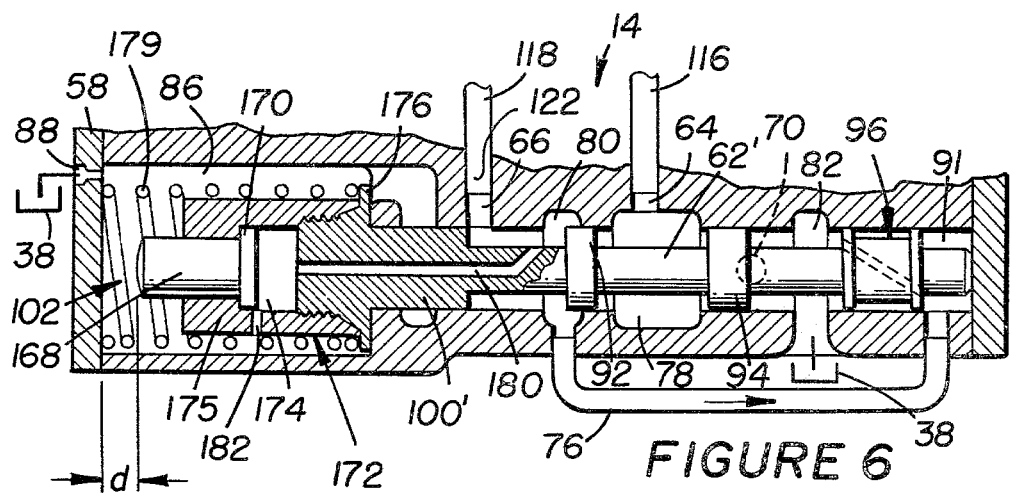
FIGS. 6-8 are enlarged sectional views of still another embodiment of the present invention showing the valve in various positions.

FIG. 6 shows an alternative embodiment of the valve means 14 of the valve 10. The valve means 14 of FIGS. 1 and 6 for generating the pressure control signal are similar and, therefore, where appropriate, like reference numerals are used to show like elements. Either embodiment of the switch means 16 shown in FIG. 1 or FIG. 5 can be used with the embodiment of the valve means 14 of FIG. 6.

FIG. 6 shows a spool 62', which is similar to the spool 62, and another embodiment of the means 102 for controlling or opposing the movement of the spool 62' from right to left as viewed in FIG. 6. A piston 168 of the means 102, having a head 170, is coupled internally of the fluid chamber 86 a short distance d from the body 58. A hollow cylindrical member 172 forms a fluid chamber 174 in which the head 170 of the piston 168 is disposed. The member 172 has a collar 175 coupled around the piston 168 so the piston 168 can be slidable relative to the collar 175, and a flange 176 adjacent the land 100' of spool 62'. A spring 179 is disposed between the body 58 and the flange 176 to bias the spool 62' to the right.

The spool 62' has an internal fluid passage 180 that extends through the member 172 to communicate the inlet 66 with the chamber 174. An opening 182 in the member 172 communicates the fluid chamber 174 with the fluid chamber 86 leading to the orifice 88.

INDUSTRIAL APPLICABILITY

The valve 10 can be used in a hydraulic control system for a hydrostatic transmission for a tractor. Specifically, the valve 10 can be used in place of the speed control and vent valves shown in the above mentioned U.S. Pat. No. 3,952,514. In describing the operation of the valve 10, the embodiment of FIGS. 1-4 first will be discussed.

In FIG. 1, the three positions of the spool 22 are indicated, including maximum speed, zero speed, and vent and brakes positions. The spring 56 biases the spool 22 into the maximum speed position in which the land 52 blocks communication between the pair of differential pressure lines 32, and the land 48 maintains open communication between the supply conduit 26 and outlet 30, while closing the conduit 26 to the chamber 44, line 36 and tank 38. In discussing FIGS. 1-4, the spool 22 is assumed to remain in the position shown in FIG. 1.

Assume that the valve means 14 is in the position shown in FIG. 1, which corresponds to a first or initial position, and that the switch means 16 is in the normally open position corresponding to one state, i.e., the off or de-energized state for the solenoid 124. Also assume that the tractor engine is started so that a pump (not shown) is driven to commence pumping a supply of pressurized fluid through the conduit 26.

The fluid supply in conduit 26 flows through the inlet 24, groove 40, groove 42, and the outlet 30 to the passage 112. A portion of this fluid passes into the inlet 64 and groove 78, but this has no effect on the movement of the spool 62 since equal and opposite forces will be exerted on the land 92 and land 94. The remaining supply in the passage 112 will pass through the end 120 of the passage 118, the normally open solenoid 124 and the end 122 to the inlet 66 and bore 60. From there, the supply will flow through the groove 80, outlet 72 and passage 76 into the inlet 74 and chamber 91. Consequently, the fluid in the chamber 91 will act on the land 96 to commence moving the spool 62 from its first or initial position shown in FIG. 1 to a second or intermediate position shown in FIG. 2.

As shown in FIG. 2 in this intermediate position, the spool 62 will have moved against the bias of the spring 104 so that the land 100 opens communication between the inlet 66 and the groove 84. Also, the land 92 closes communication between the inlet 66 and the outlet 72. Consequently, the supply being received in the inlet 66 flows into the chamber 86 and through the restricted orifice 88 to the tank 38. In this intermediate position, the fluid pressure in the chamber 86, the groove 84 and the area of bore 60 between land 100 and land 92, together with the biasing of the compressed spring 104, are sufficient to equalize the pressure acting in the chamber 91 and maintain the spool 62 in the intermediate position. The fluid pressure in chamber 91 is maintained by fluid pressure through line 112, groove 78, outlet 72 and passage 76, into chamber 91. Also, in this intermediate position, the outlet 70 is in communication with the tank 38 via the line 68 so that the pressure control signal is not generated, whereby the transmission remains vented and the parking brake remains engaged. Thus, with the engine started and the switch means 16 remaining in the normally open position, the tractor will not move.

Then, to commence movement of the tractor, the operator need merely flip the switch 132 to the on position to energize the solenoid 124 and close the passage 118. As a result, all of the fluid supply in the passage 112 will flow into the inlet 64, the groove 78 and the groove 80 to the passage 76 and chamber 91. The chamber 86 will have its supply of fluid cut off by the closure of the passage 118 and will be drained through the orifice 88 to the tank 38. Consequently, the pressure in the chamber 91 will be sufficient to move the spool 62 from its intermediate position shown in FIG. 2 to its final position shown in FIG. 3 against the bias of both the spring 104 and the spring 110. In the final position shown in FIG. 3, the land 96 blocks communication between the outlet 70 and the line 68 leading to the tank 38. Also, the land 94 is in a position in which the inlet 64 communicates with the outlet 70. Consequently, the supply in the passage 112 provides a pressure control signal in the outlet 70 so that the transmission is actuated and the parking brake is disengaged. Consequently, at this time, the tractor can move.

Assume now, that the valve 10 is in the final position shown in FIG. 3 and that the pressure of the supply in the passage 112 drops. This can be, for example, as a result of the engine being shut off or a temporary line failure. As a result, the biasing forces of the spring 104 and the spring 110 commence moving the spool 62 from the final position of FIG. 3 to the initial position of FIG. 1. During this movement, the fluid in the chamber 91 will bleed through the passage 98 to the line 68 and across the land 96 to the tank 38. The position of the valve 10 then will be as shown in FIG. 4 in which the valve means 14 is in the initial position and the switch means 16 is in the closed position. The outlet 70 is in communication with the line 68 and the tank 38 so that the pressure control signal is not generated and the transmission is vented with the parking brake engaged.

Then if, for example, the engine is started again, the pressurized supply in the passage 112 will all flow into the inlet 64 and groove 78. The spool 62 will be prevented from moving from the initial position since there will be equal and opposite forces on the land 92 and the land 94. Therefore, the operator will have to initiate a sequence in which the switch means 16 first must be switched to its normally open position by turning off the switch 132. This will open the passage 118 and move the spool 62 from the initial position to the intermediate position as already described. Thereafter, the operator will have to turn on the switch 132 to close the passage 118 to move the spool 62 from the intermediate position to the final position, as already described, to generate the pressure control signal in outlet 70 and, thereby, actuate the transmission and release the parking brake.

Now, assume that the valve 10 is in the position shown in FIG. 3 with the spool 22 in the maximum speed position. As already mentioned, the transmission will be actuated and the brake disengaged. Also, since the spool 22 is in the maximum speed position, the tractor can be moving at maximum speed. This is because of a maximum differential pressure between the lines 32.

Now, to control the speed of the tractor, the spool 22 can be manually moved continuously from the maximum speed position to the zero speed position. During this movement the metering slot 54 of the land 52 will control communication between the pair of lines 32 so as to vary the differential pressure between these lines. As the differential pressure changes, the tractor speed will change. At the zero speed position, the pair of lines 32 are in full communication so that the differential pressure is zero and the tractor will not move. Also, in this zero speed position, the metering slot 50 of land 48 will meter some of the supply in the line 26 to the chamber 44, but most will still flow in the passage 112 to provide the pressure control signal in the outlet 70. Then, to vent the transmission and engage the brake, the spool 22 can be moved to the vent and brakes position, whereby the land 48 will allow for full communication of the supply in the line 26 with the chamber 44 and the outlet 36 to the tank 38. Consequently, none of the supply will flow into the passage 112 and the spool 62 will then automatically move from its final position shown in FIG. 3 to the initial position shown in FIG. 1. The pressure control signal in the outlet 79 will not be generated so that the transmission is vented and the parking brake engaged.

Note also that with the valve 14 in the FIG. 3 final position, the spool 62 can be shifted to the initial position by returning the switch means 16 to its normally open position. This will open the passage 118 to introduce fluid into the inlet 66, whereby the spool 62 will shift to the right. This requires only the quick action of turning off the switch 132 to de-energize the solenoid 124.

In FIG. 5, the pilot valve 148, the lever 164 and the cam 166 can be likened to the switch 132. That is, the lever 164 and pilot valve 148 have two positions corresponding to the off and on positions of the switch 132. FIG. 5 shows the lever 164 and pilot valve 148 being in the off position, whereby a pressure differential is produced across the orifice 140 of the poppet valve 136. Consequently, the head 138 can be unseated from the seat 142 to open the passage 118. This corresponds to the normally open position of the solenoid 124 described in connection with FIGS. 1 and 2. As already indicated, in FIG. 1, the spool 62 of the valve means 14 will be in the initial position and in FIG. 2 it will be in the intermediate position.

Then, to move the spool 62 from the intermediate position to the final position shown in FIG. 3, the lever 164 can be switched to its on position, whereby the spool 156 of the pilot valve 148 is moved to close communication between the inlet 150 and the outlet 158. Consequently, the head member 138 will be seated on the seat 142 to close the passage 118. In this position, as already described in connection with FIG. 4, should the pressure in the supply in passage 112 drop, the valve means 14 will automatically shift from the final position to the initial position. The operator then will have to move the lever 164 from the on position to the off position and then back to the on position to again be able to move the tractor.

FIG. 6 shows the valve means 14 having the spool 62' in the first or initial position. If it is assumed that the switch means 16 is in the normally open position, then the pressurized fluid supply will flow through the end 122 into the inlet 66 and passage 76 to the chamber 91. This supply also will flow into the internal passage 180 and the chamber 174. The fluid in the chamber 174 will apply a force to head 170 and also will leak through the opening 182 into the chamber 86 and flow out the restricted orifice 88 to the tank 38.

Figure 7:
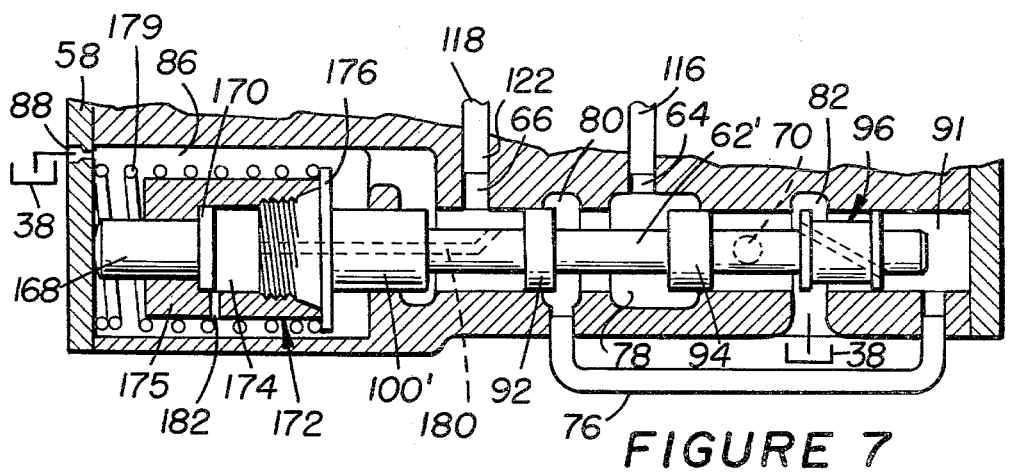

As the fluid enters the chamber 91, the spool 62' will be moved from the initial position to the intermediate position shown in FIG. 7, with the piston 168 and member 172 moving together. In this position, the piston 168 will contact the housing 58 and spring 179 will be slightly compressed. Consequently, the pressure in the chamber 174 against head 170 acts against the pressure in the chamber 91 and maintains the spool 62' in the intermediate position. In other words, the spool 62' cannot move or slide the member 172 relative to the piston 168.

Figure 8:
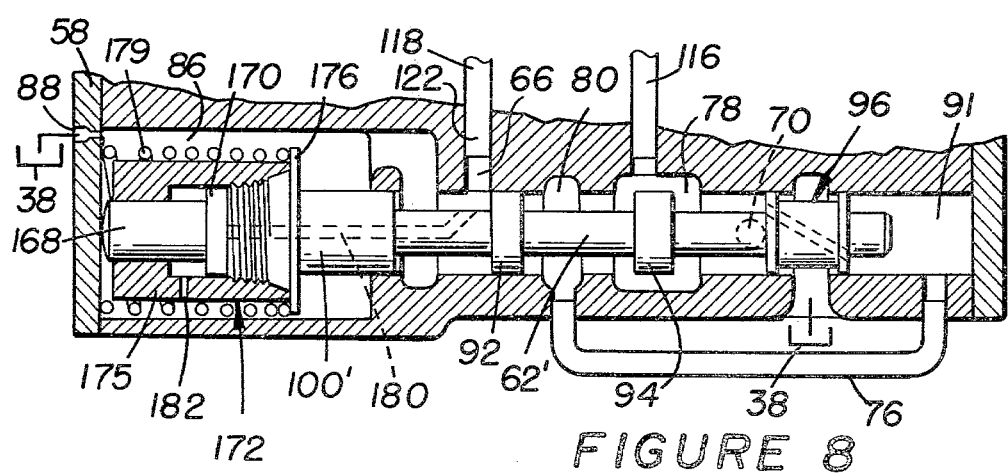

Thereafter, the spool 62' can be moved to the final position shown in FIG. 8 by closing the switch means 16. As a result, all the fluid supply will flow into the inlet 64 and the passage 76 to the chamber 91 while the fluid in the chamber 174, whose supply is now cut off, will drain out back through the passage 180, as well as through the opening 182, to the chamber 86 and orifice 88. Consequently, the pressure in chamber 91 will move the spool 62' further to the left to the FIG. 8 position with the member 172 sliding on the piston 168 and the spring 179 being further compressed. The spool 62', when in the final position, can automatically return to the initial position should the pressure supply drop, as described above, in a similar manner as described in connection with FIG. 4.

Thus, with the valve 10, advantageously the operator need only flick or switch on and off a two-state switch means 16 to control generation of the pressure control signal in the outlet 70. For example, operator skill in generating the control signal is not required since this requires only flicking the switch means 16 from its off or normally open position to its on or closed position.

The valve means 12 need not be moved at all and there still can be a fluid supply in the passage 112 to move the valve means 14. Also, the opposing means 102 will prevent the tractor from moving when the engine is initially started unless the operator actuates the switch means 16 through the above described sequences since the valve means 14 can only move from the initial to the intermediate position and then from the intermediate to the final position, as controlled by the opposing means 102.

Other aspects, objects and advantages of this invention can be obtained from a study of the drawings, disclosure and appended claims.

What is claimed is:

1. In a valve (10) having first valve means (12) for supplying pressurized fluid, said first valve means (12) including a pair (34) of pressure differential control openings and a spool (22) being constructed to control the pressure differential between said pair (34) of openings, and second movable valve means (14) for generating a fluid control signal, said second valve means (14) being movable in response to said pressurized fluid between an initial position at which said control signal is not generated and a final position at which said control signal is generated, the improvement comprising:
    switch means (16) for controlling communication of said pressurized fluid between said first valve means (12) and said second valve means (14) to move said second valve means (14) from said initial position to said final position; and
    means (56) for biasing said spool (22) to maximize said pressure differential.

2. In a valve (10) according to claim 1 wherein said second valve means (14) includes a first fluid inlet (64) and a second fluid inlet (66), wherein said first valve means (12) includes a first fluid passage (112) communicating said fluid with said first fluid inlet (64), and wherein said switch means (16) includes:
    (a) an openable and closeable second fluid passage (118) having one end (120) in fluid communication with said first passage (112) and another end (122) in fluid communication with said second fluid inlet (66); and
    (b) means (135) for opening said second fluid passage (118) to communicate substantially all of said fluid in said first fluid passage (112) with said second fluid inlet (66) and for closing said second fluid passage (118) to communicate all of said fluid in said first passage (112) with said first inlet (64).

3. In a valve (10) according to claim 2 wherein said means (135) for opening and closing includes:
    (a) a solenoid valve (124) being movable between a first position and a second position; and
    (b) a switch (132) having one state corresponding to said first position and another state corresponding to said second position and being electrically connected to said solenoid valve.

4. In a valve (10) according to claim 3 wherein said first position is a normally open position and said second position is a closed position.

5. In a valve (10) according to claim 2 wherein said means (135) for opening and closing includes:
    (a) a poppet valve (136) being positionable between a first open position and a second closed position; and
    (b) fluid valve means (148,164,166) for controlling the positioning of said poppet valve (136).

6. In a valve (10) according to claim 5 wherein said fluid valve means (148,164,166) includes:
 (a) a pilot valve (148) being movable between a first position corresponding to said first position of said poppet valve (136) and a second position corresponding to said second position of said poppet valve (136); and
 (b) lever means (164,166) for moving said pilot valve (148).

7. In a valve (10) according to claim 6 wherein said poppet valve 136 includes a head member (138) having a fluid orifice (140) therethrough and being seated in said second passage (118).

8. In a valve (10) according to claim 7 wherein said pilot valve (148) includes:
 (a) a fluid inlet (150) in fluid communication with said fluid orifice (140) of said poppet valve (136);
 (b) a fluid outlet (158); and
 (c) a spool (156) being movable between said first position at which said fluid inlet (150) of said pilot valve (148) is in fluid communication with said fluid outlet (158) of said pilot valve (148), and a second position at which said fluid inlet (150) of said pilot valve (148) is closed to said fluid outlet (158) of said pilot valve (148).

9. Apparatus (10) for generating a control signal, comprising:
 (a) a first valve (12) having a fluid outlet (30);
 (b) a second valve (14) having a first fluid inlet (64), a second fluid inlet (66), an openable fluid outlet (70), and a spool (62 or 62') being movable in response to fluid in said first fluid inlet (64) and said second fluid inlet (66) between a first position, a second position and a third position at which said openable fluid outlet (70) is open to produce the control signal;
 (c) a first fluid passage (112) having a first end (114) coupled to said fluid outlet (30) of said first valve (12) and a second end (116) coupled to said first fluid inlet (64); and
 (d) two-state switch means (16) for communicating fluid in said first fluid passage (112) to said second inlet (66) in response to a first state of said switch means (16) to move said spool (62 or 62') from said first position to said second position and for communicating fluid in said first fluid passage (112) to said first inlet (64) in response to a second state of said switch means (16) to move said spool (62 or 62') from said second position to said third position.

10. Apparatus (10) according to claim 9 wherein said fluid outlet (30) of said first valve (12) and said first fluid passage (112) are continually open to one another.

11. Apparatus (10) according to claim 9 wherein said second valve (14) includes means (102) for opposing the movement of said spool (62 or 62') between said first position and said third position.

12. Apparatus (10) according to claim 11 wherein said means (102) for opposing includes:
 (a) a first biasing spring (104) being constructed to oppose the movement of said spool (62) from said first and second positions; and
 (b) a second biasing spring (110) being constructed to oppose the movement of said spool (62) from said second position to said third position.

13. Apparatus (10) according to claim 11 wherein said means (102) for opposing includes:
 (a) piston means (168) for stopping the movement of said spool (62') at said second position; and
 (b) a spring (179) being constructed to oppose the movement of said spool (62') between said first, said second and said third positions.

14. Apparatus (10) according to claim 9 wherein said two-state switch means (16) includes:
 (a) an openable and closeable second fluid passage (118) having one end (120) coupled to said first fluid passage (112) intermediate said first end (114) and said second end (116) of said first fluid passage (112), and having another end (122) coupled to said second fluid inlet (66); and
 (b) valve means (135) for opening said second fluid passage (118) in said first state and for closing said second fluid passage (118) in said second state.

15. Apparatus (10) according to claim 14 wherein said valve means (135) includes:
 (a) a solenoid valve (124); and
 (b) a switch (132) electrically connected to said solenoid valve (124).

16. Apparatus (10) according to claim 14 wherein said valve means (135) includes:
 (a) a poppet valve (136);
 (b) a pilot valve (148) being fluid coupled to said poppet valve (136); and
 (c) a lever (164) being connected to said pilot valve (148).

17. A speed control and transmission vent valve (10), comprising:
 (a) a first valve (12) having a pair (34) of differential pressure control openings, a fluid supply inlet (24), a fluid supply outlet (30), and a manually movable spool (22) having a first land (48) continually opening said fluid supply inlet (24) to said fluid supply outlet (30) and a second land (52) controlling the pressure differential in said pair (34) of differential pressure control openings;
 (b) a second valve (14) having a first fluid inlet (64), a second fluid inlet (66), a third fluid inlet (74), a first fluid outlet (72), a second fluid tank outlet (68) and a third fluid control signal outlet (70), a first passage (76) communicating said first fluid outlet (72) with said third fluid inlet (74), an automatically movable spool (62 or 62') having a first land (92), a second land (94) and a third land (96) having one side open to said third fluid inlet (74), said automatically movable spool (62 or 62') being movable between an initial position, an intermediate position and a final position, wherein,
  (i) at said initial position said third land (96) opens said control signal outlet (70) to said tank outlet (68), said first land (92) opens said second fluid inlet (66) to said first fluid outlet (72), and said first land (92) and said second land (94) trap fluid received therebetween from said first inlet (64),
  (ii) at said intermediate position said third land (96) opens said control signal outlet (70) to said tank outlet (68), said first land (92) closes said second inlet (66) to said first passage (76), and said first land (92) and said second land (94) open therebetween said first fluid inlet (64) to said first fluid outlet (72), and
  (iii) at said final position, said third land (96) closes said control signal outlet (70) to said tank outlet (68), said first land (92) closes said second fluid inlet (66) to said first fluid outlet (72), and said second land (94) opens said first fluid inlet (64) to said control fluid outlet (70);

(c) a second fluid passage (112) having a first end (114) coupled to said supply outlet (30) and having a second end (116) coupled to said first fluid inlet (64); and (d) switch means (16) for controlling the flow of fluid in said second passage (112) between said first fluid inlet (64) and said second fluid inlet (66).

18. A valve (10) according to claim 17 wherein said switch means (16) includes:

(a) an openable and closeable third fluid passage (118) having one end coupled to said second passage (112) and another end (122) coupled to said second fluid inlet (66);

(b) a solenoid valve (124); and (c) a switch (132) electrically connected to said solenoid valve (124).

19. A valve (10) according to claim 17 wherein said switch means (16) includes:

(a) an openable and closeable third fluid passage (118) having one end coupled to said second passage (112) and another end (122) coupled to said second fluid inlet (66);

(b) a poppet valve (136) connected to said third passage (118);

(c) a pilot valve (148) in fluid communication with said poppet valve (136); and (d) a manual lever (164) connected to said pilot valve (136).

* * * * *